(12) United States Patent
Ijadi-Maghsoodi et al.

(10) Patent No.: US 10,752,478 B2
(45) Date of Patent: Aug. 25, 2020

(54) COAXIAL HOIST GEARTRAIN CARTRIDGE

(71) Applicant: Goodrich Corporation, Charlotte, NC (US)

(72) Inventors: Bejan Ijadi-Maghsoodi, Diamond Bar, CA (US); Domenic Dezan, Upland, CA (US)

(73) Assignee: Goodrich Corporation, Charlotte, NC (US)

( * ) Notice: Subject to any disclaimer, the term of this patent is extended or adjusted under 35 U.S.C. 154(b) by 291 days.

(21) Appl. No.: 15/910,792

(22) Filed: Mar. 2, 2018

(65) Prior Publication Data

US 2018/0251349 A1 Sep. 6, 2018

Related U.S. Application Data

(60) Provisional application No. 62/466,868, filed on Mar. 3, 2017.

(51) Int. Cl.
*B66D 1/22* (2006.01)
*F16H 57/10* (2006.01)
(Continued)

(52) U.S. Cl.
CPC ............... *B66D 1/22* (2013.01); *B66D 1/225* (2013.01); *B66D 1/28* (2013.01); *B66D 3/22* (2013.01);
(Continued)

(58) Field of Classification Search
CPC ...... B66D 1/22–225; B66D 3/22; B66D 1/12; B64D 1/22; F16H 57/10; F16H 57/02;
(Continued)

(56) References Cited

U.S. PATENT DOCUMENTS

| 1,323,245 | A | * | 12/1919 | Borkes | ............... B66D 1/22 254/344 |
|---|---|---|---|---|---|
| 4,430,909 | A | | 2/1984 | Magnuson | |
| 4,736,929 | A | | 4/1988 | McMorris | |
| 4,854,547 | A | * | 8/1989 | Oliphant | ............... B66D 1/22 254/271 |

(Continued)

FOREIGN PATENT DOCUMENTS

CN  202579833 U  12/2012
CN  203903865 U  10/2014
(Continued)

OTHER PUBLICATIONS

Extended European Search Report for Application No. 18159780.8, dated Aug. 6, 2018, 7 pages.
(Continued)

*Primary Examiner* — Sang K Kim
*Assistant Examiner* — Nathaniel L Adams
(74) *Attorney, Agent, or Firm* — Kinney & Lange, P.A.

(57) ABSTRACT

A drive train for a rescue hoist includes a first stage, a second stage, and a third stage. The first stage receives an input from a motor and the third stage provides rotational power to a cable drum. The first stage, second stage, and third stage are disposed coaxially within a common housing. The first stage provides a first speed reduction, the second stage provides a second speed reduction, and the third stage provides a third speed reduction between the motor and the cable drum. The common housing includes a mounting flange for mounting the drive train to the rescue hoist.

19 Claims, 4 Drawing Sheets

(51) Int. Cl.
  *F16H 57/02* (2012.01)
  *F16H 1/46* (2006.01)
  *F16H 57/00* (2012.01)
  *B66D 3/22* (2006.01)
  *B66D 1/28* (2006.01)
  *B64D 1/22* (2006.01)
  *B66D 1/12* (2006.01)
  *B66D 1/60* (2006.01)

(52) U.S. Cl.
  CPC ........... *F16H 1/46* (2013.01); *F16H 57/0018* (2013.01); *F16H 57/02* (2013.01); *F16H 57/10* (2013.01); *B64D 1/22* (2013.01); *B66D 1/12* (2013.01); *B66D 1/60* (2013.01); *F16H 2057/02082* (2013.01)

(58) Field of Classification Search
  CPC ................... F16H 1/46; F16H 57/0018; F16H 2057/02082
  See application file for complete search history.

(56) References Cited

U.S. PATENT DOCUMENTS

| | | | |
|---|---|---|---|
| 5,860,635 A * | 1/1999 | Morfitt | B66D 1/22 188/290 |
| 7,000,904 B2 * | 2/2006 | Huang | B66D 1/22 254/323 |
| 2005/0279978 A1 | 12/2005 | Huang | |
| 2010/0051890 A1 | 3/2010 | Lauder et al. | |

FOREIGN PATENT DOCUMENTS

| | | |
|---|---|---|
| KR | 101080640 B1 | 9/2011 |
| WO | WO 2015137811 A1 | 9/2015 |

OTHER PUBLICATIONS

First Chinese Office Action for CN Application No. 201810175041.2, dated Apr. 23, 2020, pp. 16.

* cited by examiner

COAXIAL HOIST GEARTRAIN CARTRIDGE

CROSS-REFERENCE TO RELATED APPLICATION(S)

This application claims the benefit of U.S. Provisional Application No. 62/466,868 filed Mar. 3, 2017 for "COAXIAL HOIST GEARTRAIN CARTRIDGE SEALED RESCUE HOIST DRUM BELLOW SYSTEM".

BACKGROUND

This disclosure relates generally to hoists. More particularly, this disclosure relates to translating body rescue hoists for aircraft.

Rescue hoists deploy and retrieve a cable from a cable drum to hoist persons or cargo, and the rescue hoist may be mounted to an aircraft, such as a helicopter. The rescue hoist includes a drum off of which the cable is deployed. The cable drum rotates to spool or unspool the cable from the cable drum, with one end of the cable attached to the cable drum and the other end, which can include a hook or other device, deployed during operation. The cable drum requires a gear reduction between the motor and the cable drum to provide a desired rotational speed of the cable drum. The gear reduction typically includes several shafts arranged parallel to each other. The parallel shafts induce large radial combined forces, thus necessitating robust bearings and other supporting components within the rescue hoist. Moreover, each shaft and gear set must be individually installed and aligned with the various other components of the overall transmission system.

SUMMARY

According to an aspect of the disclosure, a drive train includes a housing having a first end and a second end, a first stage disposed within the housing proximate the first end, a second stage disposed within the housing proximate the second end, and a third stage disposed within the housing between the first stage and the second stage. The first stage, the second stage, and the third stage are disposed coaxially on a drive train axis.

According to another aspect of the disclosure, a rescue hoist includes a cable drum rotatable about a cable drum axis, a stationary frame supporting the cable drum, and a drive train disposed within the cable drum and configured to drive the cable drum about the cable drum axis. The drive train includes a housing having a first end and a second end disposed opposite the first end, a first stage disposed within the housing proximate the first end, a second stage disposed within the housing proximate the second end, and a third stage disposed within the housing between the first stage and the second stage. The first stage, the second stage, and the third stage are disposed coaxially on the cable drum axis.

DETAILED DESCRIPTION

Figure 1A:
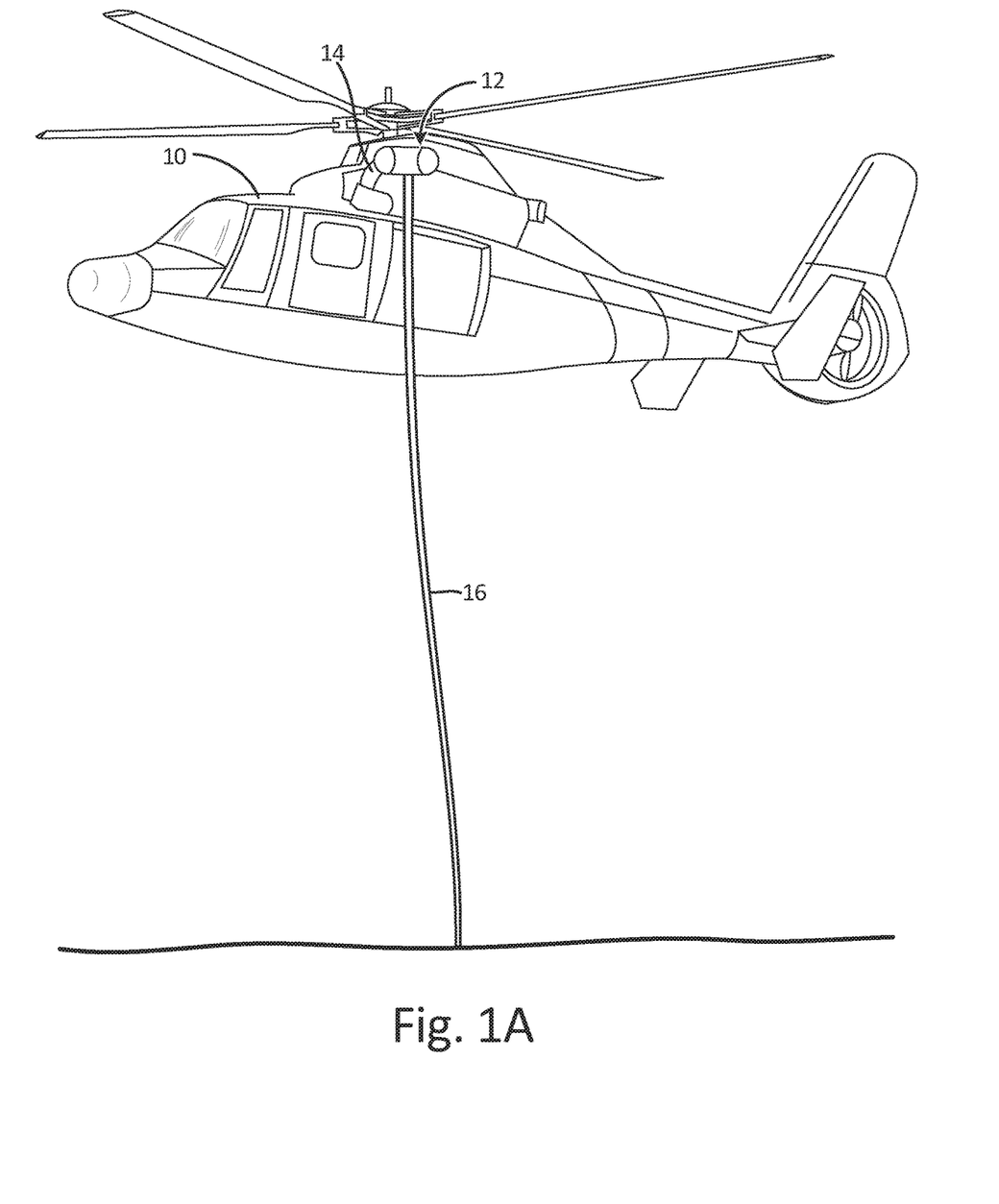
FIG. 1A is an elevation view of an aircraft and rescue hoist.
Figure 1B:
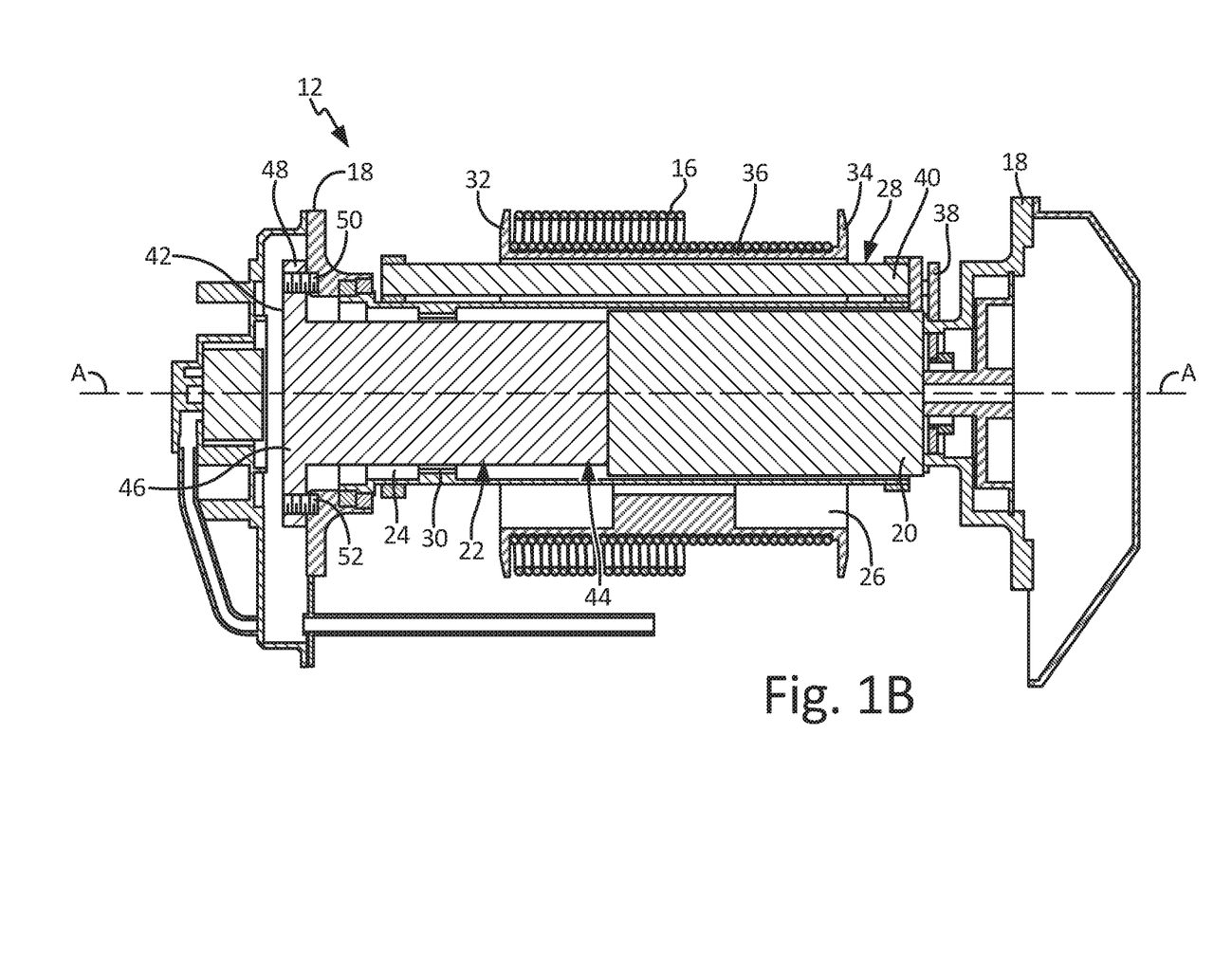
FIG. 1B is a cross-sectional view of a rescue hoist.

FIG. 1A is a perspective view of aircraft 10 and rescue hoist 12. FIG. 1B is a cross-sectional view of rescue hoist 12. FIGS. 1A and 1B will be discussed together. Rescue hoist 12 is mounted to aircraft 10 by support 14, and cable 16 extends from rescue hoist 12. Rescue hoist 12 includes frame 18, motor 20, drive train 22, linear bearing 24, cable drum 26, and level wind mechanism 28. Linear bearing 24 includes input ring 30. Cable drum 26 includes first flange 32, second flange 34, and barrel 36. Barrel 36 extends between and connects first flange 32 and second flange 34. Level wind mechanism 28 includes level wind gear 38 and screw 40. Drive train 22 includes housing 42. Housing includes first end 44 and second end 46, and second end 46 includes mounting flange 48. Mounting flange 48 includes fastener openings 50 and alignment openings 52.

Rescue hoist 12 is mounted to aircraft 10 by support 14. Cable 16 extends from rescue hoist 12 and is configured to raise and lower objects to and from aircraft 10. Linear bearing 24 is rotatably mounted to frame 18. Motor 20 extends from frame 18 and is disposed within linear bearing 24. Drive train 22 is connected to motor 20 and linear bearing 24, and drive train 22 is configured to transmit rotational power from motor 20 to linear bearing 24. Cable drum 26 is mounted to linear bearing 24. Level wind mechanism 28 is also mounted to linear bearing 24 and extends through cable drum 26. Cable 16 wraps around barrel 36 of cable drum 26 and is retained between first flange 32 and second flange 34.

Mounting flange 48 extends radially outward from second end 46 of housing 42. Fastener openings 50 and alignment openings 52 extend through mounting flange 48. Drive train 22 is installed within linear bearing 24 and is directly mounted to frame 18. Mounting flange 48 preferably includes two fastener openings 50 and two alignment openings 52, but it is understood that mounting flange can include any suitable number of fastener openings 50 and alignment openings 52. Fasteners (not shown) extend through fastener openings 50 and engage frame 18 to secure drive train 22 in place. Aligning pins (not shown), such as dowels, are inserted through alignment openings 52 and extend into frame 18. The aligning pins extend into frame 18 to ensure that drive train 22 is properly aligned when installed on frame 18.

During operation, motor 20 is activated and provides rotational power to drive train 22. Drive train 22 is a gear reduction drive, and drive train 22 outputs rotational power to linear bearing 24, thereby causing linear bearing 24 to rotate about cable drum axis A-A. An output gear of drive train 22 meshes with input ring 30 of linear bearing 24 to provide rotational power to linear bearing 24. In one embodiment, linear bearing 24 is a ball spline bearing, and as such linear bearing 24 is capable of transmitting torque to cable drum 26 to thereby cause cable drum to rotate about cable drum axis A-A to spool cable 16 onto cable drum 26 or unspool cable 16 from cable drum 26, while also allowing cable drum 26 to translate along cable drum axis A-A.

Level wind mechanism 28 is mounted to linear bearing 24 such that level wind mechanism 28 rotates about cable drum axis A-A with linear bearing 24. Level wind gear 38 is attached to screw 40 and is meshed with teeth on a housing of motor 20. Because the housing of motor 20 remains stationary as linear bearing 24 rotates, rotating linear bearing 24 causes level wind gear 38 to rotate due to level wind gear 38 meshing with the teeth on the housing of motor 20. Level wind gear 38 transmits the resulting rotational power to screw 40, thereby causing screw 40 to rotate. Screw 40 is connected to cable drum 26 through a follower that tracks along a thread of screw 40 as screw 40 rotates. As screw 40 rotates, the follower maintains a connection with the thread of screw 40 and tracks along the thread. Level wind mechanism 28 thus causes cable drum 26 to translate along cable drum axis A-A due to the fixed connection of the follower to cable drum 26. Translating cable drum 26 along cable drum axis A-A as cable drum 26 rotates about cable drum axis A-A ensures that cable 16 is deployed through a single point instead of through a moving elements on rescue hoist 12.

While rescue hoist 12 is described as including cable drum 26 that translates along cable drum axis A-A, it is understood that cable drum 26 can be fixed such that cable drum 26 does not translate along cable drum axis A-A. Where cable drum 26 does not translate, rescue hoist includes a translating payout point. Drive train 22 can be directly meshed with barrel 36 of cable drum 26 to cause cable drum 26 to rotate about cable drum axis A-A. Level wind mechanism 28 is meshed with a payout mechanism through which cable 16 extends. Level wind mechanism 28 rotates with cable drum 26 and causes a follower to translate relative to cable drum 26. Cable 16 is paid out and retrieved through a follower. The follower translates relative to cable drum 26 to ensure that cable 16 is levelly wound onto and off of cable drum 26. To ensure level winding of cable 16, the follower is connected to screw 40 of level wind mechanism 28, but level wind mechanism 28 will be mounted outside of cable drum 26.

Drive train 22 provides significant advantages. The gears of drive train 22 are disposed within housing 42, which allows drive train 22 to be installed as a single unit. Drive train 22 thus forms a line replaceable unit that can be quickly installed or uninstalled on rescue hoist 12. Moreover, drive train 22 is mounted to rescue hoist 12 at mounting flange 48 by fasteners and aligning pins. As such, drive train 22 requires minimal parts to install or uninstall drive train 22, thereby reducing the complexity of installation and reducing the number of small components that can be misplaced. Drive train 22 being a line replaceable unit also provides for easy installation because the various gears of drive train 22 are properly positioned and aligned within housing 42. As such, drive train 22 is easily installed by inserting drive train 22 into linear bearing 24, aligning drive train 22 with aligning pins, and securing drive train 22 to frame 18 with fasteners. Drive train 22 being a line replaceable unit also reduces the downtime of rescue hoist 12 when drive train 22 is replaced because drive train 22 can be tested apart from rescue hoist 12 to ensure that drive train 22 is properly functioning, thereby eliminating additional testing of rescue hoist 12.

Figure 2A:
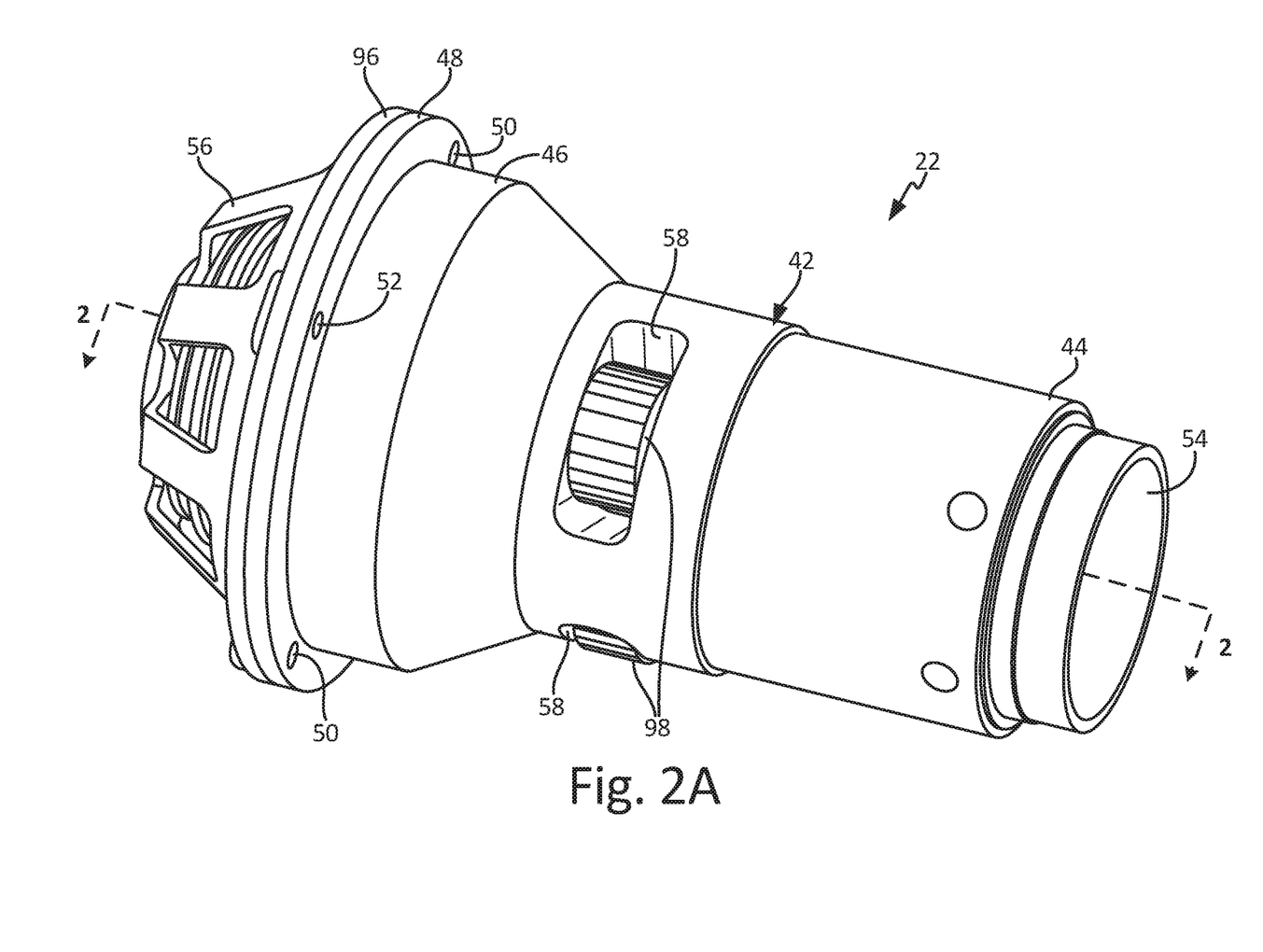
FIG. 2A is an isometric view of a drive train.
Figure 2B:
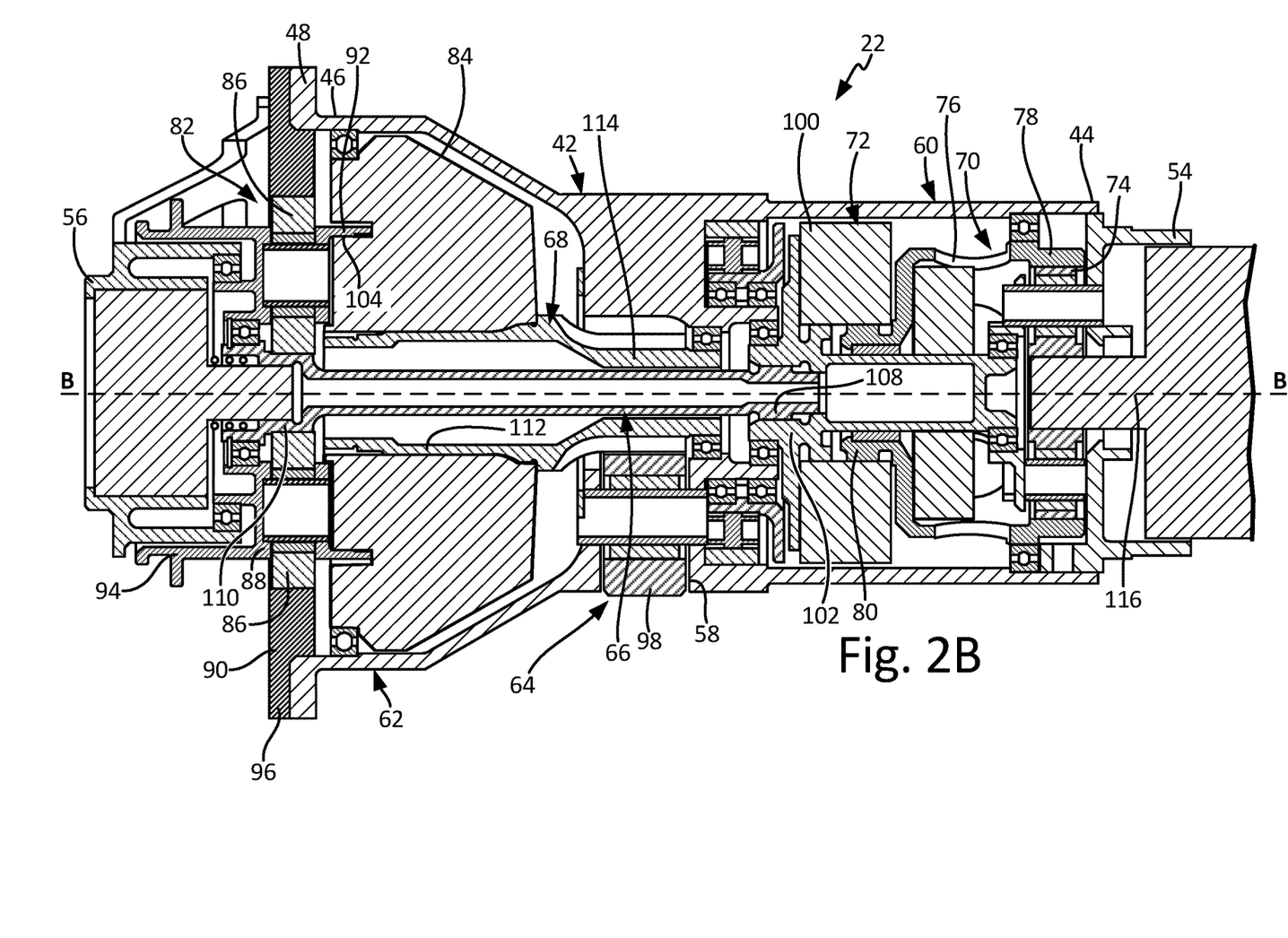
FIG. 2B is a cross-sectional view of the drive train of FIG. 2A taken along line 2-2 in FIG. 2A.

FIG. 2A is an isometric view of drive train 22. FIG. 2B is a cross-sectional view of drive train 22 taken along line 2-2 in FIG. 2A. FIGS. 2A and 2B will be discussed together. Drive train 22 includes housing 42, input housing 54, and oil pump 56. Housing 42 includes first end 44, second end 46, and drive slots 58. Second end 46 includes mounting flange 48. Mounting flange 48 includes fastener opening 50 and alignment opening 52.

Drive train 22 further includes first stage 60, second stage 62, third stage 64, first transmission shaft 66, and second transmission shaft 68. First stage 60 includes first epicyclic gear system 70 and load brake 72. First epicyclic gear system 70 includes first planetary gears 74 and first ring gear 76. First ring gear 76 includes input end 78 and output end 80. Second stage 62 includes second epicyclic gear system 82 and overload clutch 84. Second epicyclic gear system 82 includes second planetary gears 86, second carrier 88, and second ring gear 90. Second carrier 88 includes main output 92 and auxiliary output 94. Second ring gear 90 includes radial flange 96. Third stage 64 includes third planetary gears 98. Load brake 72 includes brake disc pack 100 and output shaft 102. Overload clutch 84 includes clutch input 104. First transmission shaft 66 includes input end 108 and output end 110. Second transmission shaft 68 includes input end 112 and output end 114.

Mounting flange 48 extends radially outward from second end 46 of housing 42. Fastener openings 50 and alignment openings 52 extend through mounting flange 48. Input housing 54 is attached to first end 44 of housing 42 and extends partially into first end 44 of housing 42. Drive train 22 is installed within linear bearing 24 (shown in FIG. 1B) and is directly mounted to frame 18 (shown in FIG. 1B). Mounting flange 48 preferably includes two fastener openings 50 and two alignment openings 52, but it is understood that mounting flange 48 can include any suitable number of fastener openings 50 and alignment openings 52. Fasteners extend through fastener openings 50 and engage frame 18 to secure drive train 22 in place. Aligning pins, such as dowels, are inserted through alignment openings 52 and extend into frame 18. The aligning pins extend into frame 18 to ensure that drive train 22 is properly aligned when installed on frame 18.

First stage 60, second stage 62, third stage 64, first transmission shaft 66, and second transmission shaft 68 are disposed within and contained by housing 42. First stage 60 is disposed within housing 42 proximate first end 44. Second stage 62 is disposed within housing 42 proximate second end 46. Third stage 64 is disposed within housing 42 between first end 44 and second end 46. First stage 60, second stage 62, third stage 64, first transmission shaft 66, and second transmission shaft 68 are all coaxial with drive train axis B-B. It is understood that drive train axis B-B is preferably coaxial with cable drum axis A-A (shown in FIG. 1B) when drive train 22 is installed on rescue hoist 12 (best seen in FIG. 1B).

First planetary gears 74 are supported by input housing 54, such that input housing 54 is the carrier for first stage 60. Input housing 54 holds first planetary gears 74 and prevents first planetary gears 74 from rotating about drive train axis B-B. Motor shaft 116 of motor 20 extends into input housing 54 and meshes with first planetary gears 74 to power drive train 22 from motor 20. Input end 78 of first ring gear 76 extends about and meshes with first planetary gears 74. First ring gear 76 is supported on housing 42 by a bearing disposed between first ring gear 76 and housing 42. First ring gear 76 is powered by first planetary gears 74 and rotates about drive train axis B-B. Output end 80 of first ring gear 76 is connected to and powers load brake 72.

Brake disc pack 100 and output shaft 102 of load brake 72 are driven to rotate about drive train axis B-B by first ring gear 76. Load brake 72 creates a proportional clamping force across brake disc pack 100 in response to tension caused due to a load on cable 16 (shown in FIGS. 1A-1B). Load brake 72 prevents slippage of cable 16 through the proportional clamping of brake disc pack 100 and thereby facilitates a smooth lowering motion for cable 16. Load brake 72 thus assists in controlling the speed at which cable 16 is lowered from rescue hoist 12. Load brake 72 also resists movement of cable 16 when motor 20 is not activated. First stage 60 provides a speed reduction between motor 20 and second stage 62, and as such, load brake 72 rotates one stage slower than motor 20. Output shaft 102 of load brake 72 is connected to input end 108 of first transmission shaft 66. Output shaft 102 preferably includes a female spline configured to receive a male spline of input end 108 of first transmission shaft 66. Output shaft 102 is supported by a bearing disposed between output shaft 102 and housing 42 and a bearing disposed between output shaft 102 and input housing 54. Load brake 72 provides rotational power to first transmission shaft 66 through output shaft 102.

First transmission shaft 66 extends between output shaft 102 and second stage 62 and provides power to second stage 62 from first stage 60. First transmission shaft 66 extends along and is configured to rotate about drive train axis B-B. Output end 110 of first transmission shaft 66 extends into second stage 62 and meshes with second planetary gears 86. As such, output end 110 of first transmission shaft 66 forms an input sun gear for second epicyclic gear system 82 of second stage 62. Output end 110 of first transmission shaft 66 is also connected to and powers oil pump 56. Output end 110 of first transmission shaft 66 can include both a male spline and a female spline to connect to and power both second stage 62 and oil pump 56.

Second planetary gears 86 are supported by second carrier 88. Second carrier 88 is supported for rotation about drive train axis B-B by a second bearing. Second ring gear 90 extends about second planetary gears 86. Radial flange 96 extends from second ring gear 90 and is disposed adjacent mounting flange 48. Radial flange 96 is attached to mounting flange 48 by fasteners extending through fastener openings 50. Second ring gear 90 is held stationary by the connection of radial flange 96 and mounting flange 48 such that second ring gear 90 does not rotate about drive train axis B-B.

Auxiliary output 94 of second carrier 88 is disposed outside of housing 42. Auxiliary output 94 is configured to provide power to auxiliary components of rescue hoist 12 (shown in FIGS. 1A-1B), such as a traction sheave. Main output 92 of second carrier 88 is connected to clutch input 104 of overload clutch 84. In one embodiment, main output 92 is splined to input ring 30 of overload clutch 84. It is understood that main output 92 can include either a male spline or a female spline and that clutch input 104 can correspondingly include either a female spine or a male spline. Clutch input 104 of overload clutch 84 is rotationally supported on housing 42 by a bearing disposed between clutch input 104 and housing 42.

Input ring 104 is driven by second carrier 88 and input ring 104 provides rotational power to overload clutch 84 through a clutch disc pack. Input ring 104 and overload clutch 84 are configured to rotate about drive train axis B-B. Overload clutch 84 is connected to input end 112 of second transmission shaft 68. Torque from second carrier 88 is transmitted to second transmission shaft 68 through overload clutch 84. The clutch disk pack of overload clutch 84 is configured to slip when a load on cable 16 reaches a set point that is greater than the rated load of rescue hoist 12, thereby decoupling second transmission shaft 68 from second stage 62, first transmission shaft 66, load brake 72, first stage 60, and motor 20. As such, the excess load on cable 16 is prevented from being transmitted to motor 20 by overload clutch 84, thereby providing overload protection.

Second transmission shaft 68 extends concentrically with first transmission shaft 66 about drive train axis B-B. Second transmission shaft 68 provides rotational power to third stage 64 from overload clutch 84 of second stage 62. Output end 114 of second transmission shaft 68 extends into third stage 64 and meshes with third planetary gears 98 such that output end 114 of second transmission shaft 68 forms the input sun gear for third stage 64. Third planetary gears 98 are disposed in drive slots 58 and supported on housing 42. Housing 42 thus forms the carrier for third stage 64. Third planetary gears 98 extend through drive slots 58 and are configured to mesh with input ring 30 (shown in FIG. 1B) and provide rotational power to input ring 30, thereby causing linear bearing 24 (shown in FIG. 1B) and cable drum 26 (shown in FIG. 1B) to rotate. With third planetary gears 98 supported by housing 42, third planetary gears 98 are prevented from rotating about drive train axis B-B.

During operation, motor 20 is activated to cause cable 16 to spool onto or unspool from cable drum 26. Output shaft 116 of motor 20 meshes with and causes first planetary gears 74 to rotate. First planetary gears 74 are held stationary relative to drive train axis B-B by input housing 54. First planetary gears 74 cause first ring gear 76 to rotate about drive train axis B-B and first ring gear 76 provides power to load brake 72 thereby causing load brake 72 to rotate about drive train axis B-B and provide power to first transmission shaft 66. First stage 60 thus provides power to first transmission shaft 66 from motor 20. First epicyclic gear system 70 provides a first speed reduction such that load brake 72 and first transmission shaft 66 rotate one stage slower than output shaft 116 of motor 20.

First transmission shaft 66 transmits power to second stage 62. Output end 110 of first transmission shaft 66 meshes with and causes second planetary gears 86 to rotate. Second planetary gears 86 and second carrier 88 rotate about drive train axis B-B, and second carrier 88 provides rotational power to overload clutch 84 causing overload clutch 84 to rotate about drive train axis B-B. Overload clutch 84 is connected to second transmission shaft 68 and transmits torque from second stage 62 to second transmission shaft 68. Overload clutch 84 thus powers second transmission shaft 68 to rotate about drive train axis B-B. Second epicyclic gear system 82 provides a second speed reduction such that overload clutch 84, and thus second transmission shaft 68, rotate one stage slower than first transmission shaft 66 and load brake 72. Second transmission shaft 68 thus rotates two stages slower than output shaft 116 of motor 20.

Second transmission shaft 68 transmits rotational power to third stage 64. Third planetary gears 98 are supported by housing 42 and provide power to linear bearing 24 from second transmission shaft 68. Third stage 64 provides a speed reduction between second transmission shaft 68 and linear bearing 24 causing linear bearing 24 to rotate one stage slower than second transmission shaft 68. Third stage 64 thus provides a third speed reduction between motor 20 and linear bearing 24, such that linear bearing 24 rotates three stages slower than output shaft 116 of motor 20. While third planetary gears 98 are described as meshing with input ring 30 of linear bearing 24, it is understood that in other embodiments, third planetary gears 98 can mesh directly with an input ring disposed on an inner surface of barrel 36 (shown in FIG. 1B) of cable drum 26. As such, third planetary gears 98 can be either directly or indirectly connected to cable drum 26 to provide rotational power to cable drum 26.

Drive train 22 provides significant advantages. First stage 60, second stage 62, third stage 64, first transmission shaft 66, and second transmission shaft 68 all share drive train axis B-B, thereby reducing the forces on the supporting bearings of drive train 22. Because the driving components are aligned on drive train axis B-B, the radial forces cancel out, so smaller bearings are utilized in drive train 22, thereby reducing the material cost and the weight of drive train 22. Moreover, drive train 22 is relatively compact, thereby reducing the footprint of rescue hoist 12.

Discussion of Possible Embodiments

The following are non-exclusive descriptions of possible embodiments of the present invention.

A drive train includes a housing having a first end and a second end, a first stage disposed within the housing proximate the first end, a second stage disposed within the housing proximate the second end, and a third stage disposed within the housing between the first stage and the second stage. The first stage, the second stage, and the third stage are disposed coaxially on a drive train axis.

The drive train of the preceding paragraph can optionally include, additionally and/or alternatively, any one or more of the following features, configurations and/or additional components:

The first stage includes a first stage epicyclic gear system configured to receive an output shaft of a motor as a sun gear of the first stage epicyclic gear system, and a load brake connected to and driven by the first stage epicyclic gear system. The first stage epicyclic gear system and the load brake disposed coaxially on the drive train axis.

The second stage includes a second stage epicyclic gear system configured to receive an output of the first stage as an input sun gear of the second stage epicyclic gear system, and an overload clutch connected to and driven by the second stage epicyclic gear system. The second stage epicyclic gear system and the overload clutch are disposed coaxially on the drive train axis.

The second stage epicyclic gear system includes a plurality of second stage planetary gears supported by a second stage carrier, the second stage carrier configured to rotate about the drive train axis, and the second stage carrier including a main output connected to and driving the overload clutch.

The second carrier further comprises an auxiliary output extending outside of the housing.

A first transmission shaft extending between and connecting the first stage and the second stage, and a second transmission shaft extending between and connecting the second stage and the third stage.

The first transmission shaft extends through the second transmission shaft, and the first transmission shaft and the second transmission shaft are disposed coaxially on the drive train axis.

The first transmission shaft includes a first input end and a first output end, the first input end connected to a load brake of the first stage, and the first output end connected to a plurality of second stage planetary gears of the second stage, the first output end forming a second stage sun gear. The second transmission shaft includes a second input end and a second output end, the second input end connected to at least one friction disc of an overload clutch of the second stage, and the second output end connected to a plurality of third stage planetary gears of the third stage, the second output end forming a third stage sun gear.

An input housing extending into and connected to the first end of the housing, the input housing supporting a plurality of first stage planetary gears of the first stage.

The housing supports a plurality of third stage planetary gears of the third stage.

The third stage planetary gears are disposed in slots extending through the housing.

A rescue hoist includes a cable drum rotatable about a cable drum axis, a stationary frame supporting the cable drum, and a drive train disposed within the cable drum and configured to drive the cable drum about the cable drum axis. The drive train includes a housing having a first end and a second end disposed opposite the first end, a first stage disposed within the housing proximate the first end, a second stage disposed within the housing proximate the second end, and a third stage disposed within the housing between the first stage and the second stage. The first stage, the second stage, and the third stage are disposed coaxially on the cable drum axis.

The rescue hoist of the preceding paragraph can optionally include, additionally and/or alternatively, any one or more of the following features, configurations and/or additional components:

The housing directly supports a plurality of third stage planetary gears of the third stage, the plurality of third stage planetary gears disposed in slots extending through the housing.

A linear bearing extending through the cable drum, the cable drum mounted on the linear bearing. The drive train is disposed within the linear bearing, and the plurality of third planetary gears directly engage an input ring of the linear bearing.

A mounting flange extending radially from the second end, the mounting flange attached to the stationary frame.

At least one fastener opening extending through the mounting flange, the at least fastener opening configured to receive a fastener to secure the housing to the stationary frame. At least one alignment opening extending through the mounting flange, the at least one alignment opening configured to receive an aligning pin to position the drive train on the stationary frame.

The first stage includes a first stage epicyclic gear system, the first stage epicyclic gear system configured to receive an output shaft of a motor as a first stage sun gear of the first stage epicyclic gear system, and a load brake connected to and driven by the first stage epicyclic gear system. The first stage epicyclic gear system and the load brake are disposed coaxially on the cable drum axis.

The second stage includes a second stage epicyclic gear system configured to receive an output of the first stage as a second stage sun gear of the second stage epicyclic gear system, and an overload clutch connected to and driven by the second stage epicyclic gear system. The second stage epicyclic gear system and the overload clutch are disposed coaxially on the drive train axis.

The drive train further includes a first transmission shaft extending between and connecting the first stage and the second stage, the first transmission shaft coaxial with the cable drum axis. An output end of the first transmission shaft being the second stage sun gear.

A second transmission shaft extending between and connecting the second stage and the third stage, the second transmission shaft coaxial with the cable drum axis. The first transmission shaft extends through the second transmission shaft. An output end of the second transmission shaft is a third stage sun gear for a plurality of third stage planetary gears of the third stage.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A drive train comprising:
   a housing having a first end and a second end;
   a first stage disposed within the housing proximate the first end;
   a second stage disposed within the housing proximate the second end; and
   a third stage disposed within the housing between the first stage and the second stage, the third stage including a plurality of third stage planetary gears supported by the housing;
   wherein the first stage, the second stage, and the third stage are disposed coaxially on a drive train axis;
   wherein the third stage planetary gears are disposed in slots extending through the housing.

2. The drive train of claim 1, wherein the first stage comprises:
   a first stage epicyclic gear system, the first stage epicyclic gear system configured to receive an output shaft of a motor as a sun gear of the first stage epicyclic gear system; and
   a load brake connected to and driven by the first stage epicyclic gear system;
   wherein the first stage epicyclic gear system and the load brake are disposed coaxially on the drive train axis.

3. The drive train of claim 1, wherein the second stage comprises:
   a second stage epicyclic gear system, the second stage epicyclic gear system configured to receive an output of the first stage as an input sun gear of the second stage epicyclic gear system; and
   an overload clutch connected to and driven by the second stage epicyclic gear system;
   wherein the second stage epicyclic gear system and the overload clutch are disposed coaxially on the drive train axis.

4. The drive train of claim 3, wherein the second stage epicyclic gear system further comprises:
   a plurality of second stage planetary gears supported by a second stage carrier, the second stage carrier configured to rotate about the drive train axis, and the second stage carrier including a main output connected to and driving the overload clutch.

5. The drive train of claim 4, wherein the second stage carrier further comprises an auxiliary output extending outside of the housing.

6. The drive train of claim 1, and further comprising:
   a first transmission shaft extending between and connecting the first stage and the second stage; and
   a second transmission shaft extending between and connecting the second stage and the third stage.

7. The drive train of claim 6, wherein the first transmission shaft extends through the second transmission shaft, and the first transmission shaft and the second transmission shaft are disposed coaxially on the drive train axis.

8. The drive train of claim 1, and further comprising:
   an input housing extending into and connected to the first end of the housing, the input housing supporting a plurality of first stage planetary gears of the first stage.

9. A drive train comprising:
   a housing having a first end and a second end;
   a first stage disposed within the housing proximate the first end;
   a second stage disposed within the housing proximate the second end;
   a third stage disposed within the housing between the first stage and the second stage;
   a first transmission shaft extending between and connecting the first stage and the second stage; and
   a second transmission shaft extending between and connecting the second stage and the third stage;
   wherein the first stage, the second stage, and the third stage are disposed coaxially on a drive train axis;
   wherein the first transmission shaft extends through the second transmission shaft, and the first transmission shaft and the second transmission shaft are disposed coaxially on the drive train axis;
   wherein the first transmission shaft includes a first input end and a first output end, the first input end connected to a load brake of the first stage, and the first output end connected to a plurality of second stage planetary gears, the first output end forming a second stage sun gear; and
   wherein the second transmission shaft includes a second input end and a second output end, the second input end connected to at least one friction disc of an overload clutch of the second stage, and the second output end connected to a plurality of third stage planetary gears, the second output end forming a third stage sun gear.

10. The drive train of claim 9, wherein the housing supports a plurality of third stage planetary gears of the third stage.

11. The drive train of claim 10, wherein the third stage planetary gears are disposed in slots extending through the housing.

12. A rescue hoist comprising:
   a cable drum rotatable about a cable drum axis;
   a stationary frame supporting the cable drum; and
   a drive train disposed within the cable drum and configured to drive the cable drum about the cable drum axis, wherein the drive train comprises:
      a housing having a first end and a second end disposed opposite the first end;
      a first stage disposed within the housing proximate the first end;
      a second stage disposed within the housing proximate the second end, the second stage comprising:
         a second stage epicyclic gear system, the second stage epicyclic gear system configured to receive an output of the first stage as a second stage sun gear of the second stage epicyclic gear system; and
         an overload clutch connected to and driven by the second stage epicyclic gear system;
         wherein the second stage epicyclic gear system and the overload clutch are disposed coaxially on the cable drum axis; and
      a third stage disposed within the housing between the first stage and the second stage;
      wherein the first stage, second stage, and third stage are disposed coaxially on the cable drum axis.

13. The rescue hoist of claim 12, wherein the housing directly supports a plurality of third stage planetary gears of the third stage, the plurality of third stage planetary gears disposed in slots extending through the housing.

14. The rescue hoist of claim 13, and further comprising:
   a linear bearing extending through the cable drum, the cable drum mounted on the linear bearing;
   wherein the drive train is disposed within the linear bearing, and wherein the plurality of third stage planetary gears directly engage an input ring of the linear bearing.

15. The rescue hoist of claim 12, wherein the housing further comprises:
   a mounting flange extending radially from the second end, the mounting flange attached to the stationary frame.

16. The rescue hoist of claim 15, wherein the mounting flange further comprises:
   at least one fastener opening extending through the mounting flange, the at least fastener opening configured to receive a fastener to secure the housing to the stationary frame; and
   at least one alignment opening extending through the mounting flange, the at least one alignment opening configured to receive an aligning pin to position the drive train on the stationary frame.

17. The rescue hoist of claim 12, wherein the first stage comprises:
   a first stage epicyclic gear system, the first stage epicyclic gear system configured to receive an output shaft of a motor as first stage sun gear of the first stage epicyclic gear system; and
   a load brake connected to and driven by the first stage epicyclic gear system;
   wherein the first stage epicyclic gear system and the load brake are disposed coaxially on the cable drum axis.

18. The rescue hoist of claim 12, wherein the drive train further comprises:
   a first transmission shaft extending between and connecting the first stage and the second stage, the first transmission shaft coaxial with the cable drum axis;
   wherein an output end of the first transmission shaft is the second stage sun gear.

19. The rescue hoist of claim 18, and further comprising:
   a second transmission shaft extending between and connecting the second stage and the third stage, the second transmission shaft coaxial with the cable drum axis;
   wherein the first transmission shaft extends through the second transmission shaft; and
   wherein an output end of the second transmission shaft is a third stage sun gear for a plurality of third stage planetary gears of the third stage.

* * * * *